US012049899B2

(12) United States Patent
Maynard

(10) Patent No.: US 12,049,899 B2
(45) Date of Patent: Jul. 30, 2024

(54) SYSTEMS AND METHODS FOR IMPROVING THE PERFORMANCE OF AIR-DRIVEN GENERATORS USING SOLAR THERMAL HEATING

(71) Applicant: Mark J. Maynard, Easthampton, MA (US)

(72) Inventor: Mark J. Maynard, Easthampton, MA (US)

(*) Notice: Subject to any disclaimer, the term of this patent is extended or adjusted under 35 U.S.C. 154(b) by 92 days.

(21) Appl. No.: 17/845,964

(22) Filed: Jun. 21, 2022

(65) Prior Publication Data

US 2022/0316483 A1 Oct. 6, 2022

Related U.S. Application Data

(63) Continuation-in-part of application No. 17/229,477, filed on Apr. 13, 2021, now abandoned, and a (Continued)

(51) Int. Cl.
*F04D 17/12* (2006.01)
*F03B 17/06* (2006.01)
(Continued)

(52) U.S. Cl.
CPC .............. *F04D 17/12* (2013.01); *F03B 17/06* (2013.01); *F04B 25/00* (2013.01); *F04B 41/06* (2013.01);
(Continued)

(58) Field of Classification Search
CPC ...... F04D 13/12; F04D 17/12; F04D 29/5866; F04D 29/002; F04D 29/5833; F25B 1/10;
(Continued)

(56) References Cited

U.S. PATENT DOCUMENTS 211,143 A * 1/1879 Fogarty .................... F03B 17/02
415/7
261,605 A 7/1882 Hill
(Continued)

FOREIGN PATENT DOCUMENTS

CN 1277928 A 12/2000
CN 101149039 A 3/2008
(Continued)

OTHER PUBLICATIONS

Intellectual Property Office of the Philippines, Substantive Examination Report for Allowance, for Patent Application No. 1/2020/551095, dated Oct. 18, 2022, 4 pages.
(Continued)

*Primary Examiner* — Devon C Kramer
*Assistant Examiner* — Benjamin Doyle
(74) *Attorney, Agent, or Firm* — Nutter McClennen & Fish LLP

(57) ABSTRACT

An air-driven generator system for generating electric power from movement of a working liquid. The system includes an air-driven generator that includes a liquid turbine system fluidically interposed between the lower end of an elongate gravitational distribution conduit and the lower ends of plural elongate buoyancy conduits. A heavy working liquid flows from the upper ends of the buoyancy conduits and is fed into the upper end of the elongate gravitational distribution conduit. Working liquid flows down the elongate gravitational distribution conduit to actuate the liquid turbine system. An injection of air into the working liquid in the plural elongate buoyancy conduits induces upward flow of the working liquid. The system includes a solar thermal heating system fluidically coupled to heat exchangers that transfer heat collected by the solar thermal heating system to the working fluid through a thermal transfer fluid circuit.

13 Claims, 2 Drawing Sheets

Related U.S. Application Data continuation-in-part of application No. 16/861,987, filed on Apr. 29, 2020, now Pat. No. 10,968,883, which is a continuation of application No. 16/250,736, filed on Jan. 17, 2019, now Pat. No. 10,989,110, which is a continuation of application No. 16/115,531, filed on Aug. 28, 2018, now Pat. No. 10,683,839.

(60) Provisional application No. 63/212,870, filed on Jun. 21, 2021, provisional application No. 62/618,720, filed on Jan. 18, 2018, provisional application No. 62/550,836, filed on Aug. 28, 2017.

(51) Int. Cl.

| | |
|---|---|
| ***F04B 25/00*** | (2006.01) |
| ***F04B 41/06*** | (2006.01) |
| ***F04D 13/12*** | (2006.01) |
| ***F04D 25/16*** | (2006.01) |
| ***F04D 29/00*** | (2006.01) |
| ***F04D 29/58*** | (2006.01) |
| ***F25B 1/00*** | (2006.01) |
| ***F25B 30/06*** | (2006.01) |

(52) U.S. Cl.

CPC ........... *F04D 25/16* (2013.01); *F04D 29/002* (2013.01); *F04D 29/5833* (2013.01); *F04D 29/5866* (2013.01); *F25B 30/06* (2013.01); *F04D 13/12* (2013.01); *F04D 29/5826* (2013.01); *F25B 1/00* (2013.01); *F25B 2400/061* (2013.01)

(58) Field of Classification Search

CPC ............ F25B 2309/061; F25B 2400/13; F25B 9/008; F25B 2400/072; F25B 40/00; F25B 2400/23; F25B 1/04; F25B 2309/06; F25B 25/005; F25B 30/02; F25B 31/002; F25B 40/04; F25B 41/39; F25B 43/02; F25B 9/004; F25B 13/00; F25B 2400/01; F25B 2400/16; F25B 2600/17; F25B 2600/2509; F25B 2700/21152; F25B 31/006; F25B 40/02; F25B 45/00; F25B 49/022; F25B 11/00; F25B 11/02; F25B 11/04; F25B 1/00; F25B 21/00; F25B 21/04; F25B 2339/041; F25B 2339/047; F25B 2341/0012; F25B 2341/0014; F25B 2341/0015; F25B 2400/04; F25B 2400/0411; F25B 2400/14; F25B 2400/15; F25B 2500/17; F25B 2600/02; F25B 2600/025; F25B 2600/0253; F25B 2600/026; F25B 2700/19; F25B 27/00; F25B 30/00; F25B 31/008; F25B 39/028; F25B 41/00; F25B 41/22; F25B 41/385; F25B 49/027; F25B 5/02; F25B 7/00; F25B 30/06

USPC ........... 417/248, 243, 108–117; 60/495, 496, 60/641.6, 675; 290/43, 52, 54

See application file for complete search history.

(56) References Cited

U.S. PATENT DOCUMENTS 366,551 A * 7/1887 Baker ..................... F03B 17/02 415/5
688,520 A * 12/1901 Hill ......................... F04B 49/24 417/251
1,339,137 A * 5/1920 Rogers ...................... F04F 1/18 261/DIG. 75
2,280,845 A 4/1942 Parker
2,298,984 A 10/1942 Stinson et al.
2,725,181 A 11/1955 Lamberton
2,849,173 A 8/1958 Surdy
3,002,923 A 10/1961 Barker et al.
3,014,639 A 12/1961 Gwinner
3,232,524 A 2/1966 Rice
3,360,926 A 1/1968 Parr
3,375,664 A * 4/1968 Wells, Jr. .................. F02C 1/10 60/326
3,601,979 A * 8/1971 Singer ..................... F03B 17/02 60/326
3,608,311 A 9/1971 Roesel, Jr.
3,658,442 A 4/1972 Heitmann et al.
3,850,817 A 11/1974 Barthel
3,984,698 A 10/1976 Brewer
3,988,897 A * 11/1976 Strub ...................... F02C 7/143 60/659
4,028,893 A * 6/1977 Shaw ...................... F03B 17/02 60/649
4,038,826 A * 8/1977 Shaw ...................... F03B 17/02 60/641.14
4,041,710 A * 8/1977 Kraus ................... F01K 27/005 60/673
4,054,031 A * 10/1977 Johnson .................. F03B 17/02 415/7
4,097,202 A 6/1978 Price
4,135,364 A * 1/1979 Busick .................... F16H 43/00 417/108
4,196,590 A * 4/1980 Fries ....................... F03B 17/02 60/649
4,266,402 A 5/1981 Pruett
4,326,132 A * 4/1982 Bokel ..................... F03B 17/02 290/1 R
4,392,062 A * 7/1983 Bervig .................. F03B 17/005 417/90
4,430,858 A * 2/1984 Shaw ...................... F03B 17/02 417/159
4,498,294 A * 2/1985 Everett ................... F03B 17/02 415/7
4,742,242 A * 5/1988 De Shon ................ F03B 17/02 290/1 R
4,767,938 A * 8/1988 Bervig .................. F03B 17/005 290/1 R
4,800,727 A * 1/1989 Petrick .................... F01K 27/00 310/11
4,832,578 A 5/1989 Putt
4,947,647 A 8/1990 Jensen
4,947,655 A 8/1990 Shaw
5,461,861 A 10/1995 Wenzel
5,685,147 A * 11/1997 Brassea ................... F03B 17/02 60/495
5,899,066 A 5/1999 Brassea-Flores
6,051,891 A * 4/2000 Surodin .................. F03G 6/001 290/55
6,203,285 B1 3/2001 Wagner
6,223,532 B1 * 5/2001 Brassea-Flores ....... F03B 17/02 60/671
RE37,603 E 3/2002 Coney
6,447,243 B1 * 9/2002 Kittle ...................... F03B 17/02 415/92
6,695,591 B2 2/2004 Grimmer
6,990,809 B2 * 1/2006 Abouraphael .......... F03B 17/02 60/495
7,222,487 B1 * 5/2007 Hinkley ................ F03B 17/005 290/43
7,226,895 B2 6/2007 Xiang
7,584,610 B2 9/2009 Ziegenfuss
8,008,796 B2 8/2011 Muchow
8,397,496 B2 * 3/2013 Frank .................... F03B 17/005 60/495
8,456,027 B1 * 6/2013 Seehorn ............... H02K 7/1823 290/1 R
8,572,959 B2 11/2013 Ingersoll et al.
8,667,798 B2 3/2014 Hopper et al.
8,739,540 B2 * 6/2014 Mccutchen ......... F28D 15/0266 60/671

(56) References Cited

U.S. PATENT DOCUMENTS

| | | | | |
|---|---|---|---|---|
| 8,813,488 | B2 * | 8/2014 | Gibson | F03B 17/02 60/496 |
| 8,833,070 | B2 * | 9/2014 | Wilson | F03B 17/02 415/92 |
| 8,869,531 | B2 | 10/2014 | Held | |
| 8,978,376 | B1 * | 3/2015 | Pedziwiatr | F03B 17/02 60/496 |
| 9,587,162 | B2 | 3/2017 | Fisk, Jr. | |
| 9,856,850 | B1 * | 1/2018 | Sheehan | F03B 17/005 |
| 10,543,737 | B2 * | 1/2020 | Kujak | B60H 1/3226 |
| 10,683,839 | B2 * | 6/2020 | Maynard | F03B 17/02 |
| 10,989,110 | B2 | 4/2021 | Maynard | |
| 11,532,949 | B2 * | 12/2022 | Yogev | F15B 1/04 |
| 2002/0083708 | A1 | 7/2002 | Kono et al. | |
| 2003/0175128 | A1 | 9/2003 | Fabry | |
| 2003/0192338 | A1 | 10/2003 | Manohar | |
| 2003/0215339 | A1 | 11/2003 | Grimmer et al. | |
| 2004/0011038 | A1 | 1/2004 | Stinger | |
| 2005/0189888 | A1 | 9/2005 | Federman | |
| 2006/0037337 | A1 | 2/2006 | Lear et al. | |
| 2006/0236698 | A1 | 10/2006 | Langson | |
| 2007/0065300 | A1 | 3/2007 | Mariani | |
| 2007/0189111 | A1 * | 8/2007 | Garza | F03B 17/005 366/102 |
| 2008/0008602 | A1 | 1/2008 | Pozivil | |
| 2008/0303282 | A1 * | 12/2008 | Ziegenfuss | F03B 17/005 290/52 |
| 2009/0031999 | A1 | 2/2009 | Erickson | |
| 2009/0127866 | A1 | 5/2009 | Cook | |
| 2009/0257902 | A1 | 10/2009 | Emens | |
| 2009/0297368 | A1 | 12/2009 | Knox | |
| 2010/0032133 | A1 | 2/2010 | Lifson | |
| 2010/0077788 | A1 | 4/2010 | Lewis | |
| 2010/0146961 | A1 * | 6/2010 | Silva | F03B 17/04 60/495 |
| 2010/0259044 | A1 * | 10/2010 | Muchow | E03B 11/12 137/565.17 |
| 2010/0319346 | A1 | 12/2010 | Ast | |
| 2010/0326100 | A1 | 12/2010 | Taras | |
| 2011/0049899 | A1 | 3/2011 | Hoffman | |
| 2011/0120157 | A1 | 5/2011 | Wohlert | |
| 2011/0201699 | A1 | 8/2011 | Lucas | |
| 2012/0087810 | A1 | 4/2012 | Peussa | |
| 2012/0090312 | A1 | 4/2012 | Wilson et al. | |
| 2012/0100015 | A1 | 4/2012 | Kim | |
| 2012/0117988 | A1 | 5/2012 | Mitra | |
| 2012/0174605 | A1 | 7/2012 | Huff | |
| 2013/0031934 | A1 | 2/2013 | Huff | |
| 2013/0055756 | A1 | 3/2013 | Tsutsumi | |
| 2013/0098102 | A1 | 4/2013 | Nakayama | |
| 2013/0129531 | A1 * | 5/2013 | Baker | F04D 25/16 417/243 |
| 2014/0137582 | A1 | 5/2014 | Louvar et al. | |
| 2014/0197642 | A1 * | 7/2014 | Daya | H02K 53/00 74/DIG. 9 |
| 2014/0250879 | A1 * | 9/2014 | Moncada | F03B 17/005 60/495 |
| 2015/0159919 | A1 | 6/2015 | Sato | |
| 2016/0185473 | A1 | 6/2016 | Zucchini | |
| 2016/0187893 | A1 | 6/2016 | Bergh | |
| 2016/0327049 | A1 | 11/2016 | Dinsdale | |
| 2017/0074268 | A1 | 3/2017 | De Kerpel | |
| 2017/0248349 | A1 | 8/2017 | Kujak et al. | |
| 2017/0268498 | A1 | 9/2017 | Kasahara | |
| 2018/0223846 | A1 | 8/2018 | Staffend et al. | |
| 2019/0063396 | A1 | 2/2019 | Maynard | |
| 2019/0218968 | A1 | 7/2019 | Maynard | |
| 2020/0309085 | A1 | 10/2020 | Maynard | |
| 2021/0180471 | A1 * | 6/2021 | Wright | F03G 7/04 |
| 2021/0340906 | A1 | 11/2021 | Maynard | |
| 2022/0316483 | A1 | 10/2022 | Maynard | |
| 2022/0333603 | A1 | 10/2022 | Maynard | |
| 2023/0324084 | A1 | 10/2023 | Maynard | |

FOREIGN PATENT DOCUMENTS

| | | | |
|---|---|---|---|
| CN | 203629155 | U | 6/2014 |
| CN | 107278253 | A | 10/2017 |
| CN | 109579337 | A | 4/2019 |
| CN | 113310235 | A | 8/2021 |
| EP | 1010954 | A1 | 6/2000 |
| EP | 2549095 | A1 | 1/2013 |
| FR | 2919716 | A1 | 2/2009 |
| GB | 2318393 | A | 4/1998 |
| JP | H0587299 | U | 11/1993 |
| JP | 2002235653 | A | 8/2002 |
| JP | 2010-014111 | A | 1/2010 |
| KR | 100643343 | B1 | 11/2006 |
| WO | 2010125511 | A1 | 11/2010 |
| WO | 2012017243 | A1 | 2/2012 |
| WO | 2012079171 | A1 | 6/2012 |
| WO | 2014110160 | A3 | 10/2014 |
| WO | 2017125276 | A1 | 7/2017 |

OTHER PUBLICATIONS

Israel Patent Office, Notice of Deficiencies for Patent Application 276061, dated Oct. 3, 2022, 3 pages.

Brazilian Office Action for Patent Application No. BR112020003911-0, filed Sep. 13, 2022.

Eurasian Office Action for Eurasian Patent Application No. 202091729, dated Apr. 21, 2021, 3 pages.

European Patent Office, Extended European Search Report for Patent Application No. 22153119.7, dated Jul. 8, 2022, 7 pages.

European Patent Office, Supplementary Search Report for Application No. 18850618.2, dated Dec. 3, 2020, 7 pages.

Examination Report for Indian Patent Application No. 202017032848 dated Mar. 29, 2022, 6 pages.

Indonesian Patent Office, Office Action for Application No. P0020200591 dated Aug. 8, 2022, 5 pages.

International Preliminary Report on Patentability for Application No. PCT//US2018/048413. 10 pages.

International Search Report and Written Opinion for International Patent Application No. PCT/US2018/048413, dated Jan. 4, 2019, 15 pages.

International Preliminary Report on Patentability for Application No. PCT/US2018/048413, dated Mar. 12, 2020, 10 pages.

International Search Report and Written Opinion for International Patent Application No. PCT/US2019/014039, dated Apr. 29, 2019, 7 pages.

Canadian Intellectual Property Office, Office Action for Canadian Patent Application No. 3,073,990, dated Jan. 3, 2024 (6 pages).

European Patent Office, Communication Pursuant to Article 94(3) EPC for European Patent Application No. 19740806.5, dated Sep. 22, 2023 (14 pages).

Intellectual Property Office of Vietnam, Substantive Examination for Vietnamese Patent Application No. 1-2020-01781, dated Aug. 18, 2023, with English translation (4 pages).

International Search Report and Written Opinion for International Patent Application No. PCT/US2023/017948, mailed Jul. 7, 2023, 8 pages.

IP Australia, Examination Report No. 1 for Australian Patent Application No. 2018323510, dated Oct. 17, 2023 (5 pages).

IP Australia, Examination Report No. 1 for Australian Patent Application No. 2019209876, dated Feb. 22, 2024 (5 pages).

Korean Patent Office, Notice of Grounds for Rejection for Korean Patent Application No. 10-2020-7023658, dated Feb. 1, 2024, with English Translation (16 pages).

* cited by examiner

SYSTEMS AND METHODS FOR IMPROVING THE PERFORMANCE OF AIR-DRIVEN GENERATORS USING SOLAR THERMAL HEATING

PRIORITY

This patent application claims priority from Provisional U.S. Patent Application No. 63/212,870, filed on Jun. 21, 2021, entitled, "SYSTEMS AND METHODS FOR IMPROVING THE PERFORMANCE OF AIR-DRIVEN GENERATORS USING SOLAR THERMAL HEATING," and naming Mark J. Maynard as inventor.

This patent application is also a continuation-in-part of U.S. patent application Ser. No. 16/861,987, filed on Apr. 29, 2020, and entitled, "AIR-DRIVEN GENERATOR," issued as U.S. Pat. No. 10,968,883, which is a continuation of U.S. patent application Ser. No. 16/115,531, filed Aug. 28, 2018, issued as U.S. Pat. No. 10,683,839, which claims the benefit of, and priority to, U.S. Provisional Patent Application No. 62/550,836, filed on Aug. 28, 2017.

This patent application is also a continuation-in-part of U.S. patent application Ser. No. 17/229,477, filed on Apr. 13, 2021, and entitled "GASEOUS FLUID COMPRESSION WITH ALTERNATING REFRIGERATION AND MECHANICAL COMPRESSION," which is a continuation of U.S. patent application Ser. No. 16/250,736, filed Jan. 17, 2019, issued as U.S. Pat. No. 10,989,110, which claims the benefit of, and priority to, U.S. Provisional Patent Application No. 62/618,720, filed on Jan. 18, 2018.

The seven above noted patent applications are hereby incorporated herein by reference, in their entireties, including their drawings and appendices.

BACKGROUND

For many decades, the need for realizing increased efficiency in gaseous fluid compression has been well recognized. There have been numerous attempts at achieving improved thermodynamic performance and elegance in construction in the provision of systems and methods for compressing gaseous fluids. Knowledgeable scientists and skilled inventors have endeavored to harness the principles of thermodynamics to provide for the compression of gases, such as air, with improved efficiency thereby to enable the conservation of energy and the overall advance of the art.

SUMMARY OF VARIOUS EMBODIMENTS

In accordance with an embodiment of the invention, an air-driven generator system for generating electric power from movement of a working liquid includes an elongate gravitational distribution conduit with an upper end and a lower end, and plural elongate buoyancy conduits. Each buoyancy conduit has an upper end and a lower end. The upper ends of the elongate buoyancy conduits are in fluidic communication with the upper end of the elongate gravitational distribution conduit, and the lower end of the elongate gravitational distribution conduit is in fluidic communication with the lower ends of the elongate plural buoyancy conduits. A closed fluid loop is formed between the elongate plural buoyancy conduits and the elongate gravitational distribution conduit.

The air-driven generator system includes working liquid flowing from the upper ends of the buoyancy conduits fed into the upper end of the elongate gravitational distribution conduit. Working liquid flows downwardly through the elongate gravitational distribution conduit being fed from the lower end of the elongate gravitational distribution conduit into the lower ends of the plural elongate buoyancy conduits. Working liquid fed to the upper end of the elongate gravitational distribution conduit will have a downward flow within the elongate gravitational distribution conduit to actuate the liquid turbine system.

The air-driven generator system includes a liquid turbine system fluidically interposed between the lower end of the elongate gravitational distribution conduit and the lower ends of the plural elongate buoyancy conduits.

The air-driven generator system includes an air injection system operative to inject air into the lower ends of each of the plural elongate buoyancy conduits. An injection of air into the working liquid disposed in the plural elongate buoyancy conduits will tend to induce upward flow of the working liquid in the plural elongate buoyancy conduits. The air compression system (e.g., air injection system) may include a cascading series of heat pump intercoolers.

A first heat exchanger is in fluidic communication with the lower end of each of the plural elongate buoyancy conduits. The first heat exchanger includes a first heat exchange fluid. A second heat exchanger is in fluidic communication with the first heat exchanger and in fluidic communication with each of the plural elongate buoyancy conduits. The second heat exchanger includes a second heat exchange fluid. The air-driven generator system may further include a third heat exchanger configured to move heat from the air in the upper chamber to the first heat exchanger. The use of a numbering system for identifying the heat exchangers is non-limiting, and is only intended for identifying heat exchangers. The number used to identify the heat exchangers in no way sets a limit to how many or how few heat exchangers may be deployed in various embodiments of air-driven generator system.

The air-driven generator system includes a thermal heating system configured to capture thermal energy from an external source. The thermal heating system is thermally coupled with a second heat exchanger to move the captured thermal energy into the working liquid. The thermal heating system may include solar thermal panels configured to capture thermal energy from solar radiation. The thermal heating system may include a fluid loop containing a fluid for moving thermal energy from the solar thermal panels to the second heat exchanger.

The first heat exchange fluid and the second heat exchange fluid may be the same material. The first heat exchange fluid and the second heat exchange fluid may be different materials. One or more of the heat exchange fluids may further be in thermal communication with a phase change material or the purpose of heat storage.

In accordance with another embodiment, an air-driven generator system for generating electric power from movement of a working liquid includes an air-driven generator. The air-driven generator includes an elongate gravitational distribution conduit with an upper end and a lower end, and plural elongate buoyancy conduits. Each buoyancy conduit has an upper end and a lower end. The upper ends of the elongate buoyancy conduits are in fluidic communication with the upper end of the elongate gravitational distribution conduit. The lower end of the elongate gravitational distribution conduit is in fluidic communication with the lower ends of the elongate plural buoyancy conduits, such that that a closed fluid loop is formed between the elongate plural buoyancy conduits and the elongate gravitational distribution conduit. Working liquid flowing from the upper ends of the buoyancy conduits is fed into the upper end of the elongate gravitational distribution conduit. Working liquid flowing downwardly through the elongate gravitational distribution conduit is fed from the lower end of the elongate gravitational distribution conduit into the lower ends of the plural elongate buoyancy conduits.

The air-driven generator system includes a liquid turbine system fluidically interposed between the lower end of the elongate gravitational distribution conduit and the lower ends of the plural elongate buoyancy conduits.

The air-driven generator system includes a thermal transfer fluid circuit. The thermal transfer fluid circuit includes a first heat exchanger in fluidic communication with the lower end of each of the plural elongate buoyancy conduits. The first heat exchanger includes a first heat exchange fluid. The thermal transfer fluid circuit includes a second heat exchanger in fluidic communication with the first heat exchanger and in fluidic communication with each of the plural elongate buoyancy conduits. The second heat exchanger includes a second heat exchange fluid. A portion of working fluid in the plural elongate buoyancy conduits is removed from the lower end of each of the plural elongate buoyancy conduits. The portion of working fluid circulates through the thermal transfer fluid circuit. The portion of working fluid is returned to the plural elongate buoyancy conduits. The circulation of the portion of working fluid through the thermal transfer circuit will tend to increase the temperature of the working fluid in plural elongate buoyancy conduits.

The air-driven generator system includes a compressor system in fluidic communication with each of the plural elongate buoyancy conduits and in fluidic communication with the first heat exchanger. The compressor system is operative to inject air into each of the plural elongate buoyancy conduits. The compressor system is configured to receive a portion of heat exchange fluid from the first heat exchanger, transfer heat to the portion of heat exchange fluid, and return the heated portion of the heat exchange fluid to the first heat exchanger.

The air-driven generator system includes a solar thermal heating system fluidically coupled to the second heat exchanger configured to transfer heat collected by the solar thermal heating system to the second heat exchanger.

An injection of air into the working liquid disposed in the plural elongate buoyancy conduits will tend to induce upward flow of the working liquid in the plural elongate buoyancy conduits. The working liquid fed to the upper end of the elongate gravitational distribution conduit will have a downward flow within the elongate gravitational distribution conduit to actuate the liquid turbine system.

The system may further include a third heat exchanger in fluidic communication with the upper chamber and in fluidic communication with the first heat exchanger. The third heat exchanger may be configured to receive air from the upper chamber, transfer heat present in the air to the first heat exchange fluid, and transfer the heat present in the first heat exchange fluid to the first heat exchanger.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Air-Driven Generator Systems

Figure 1:
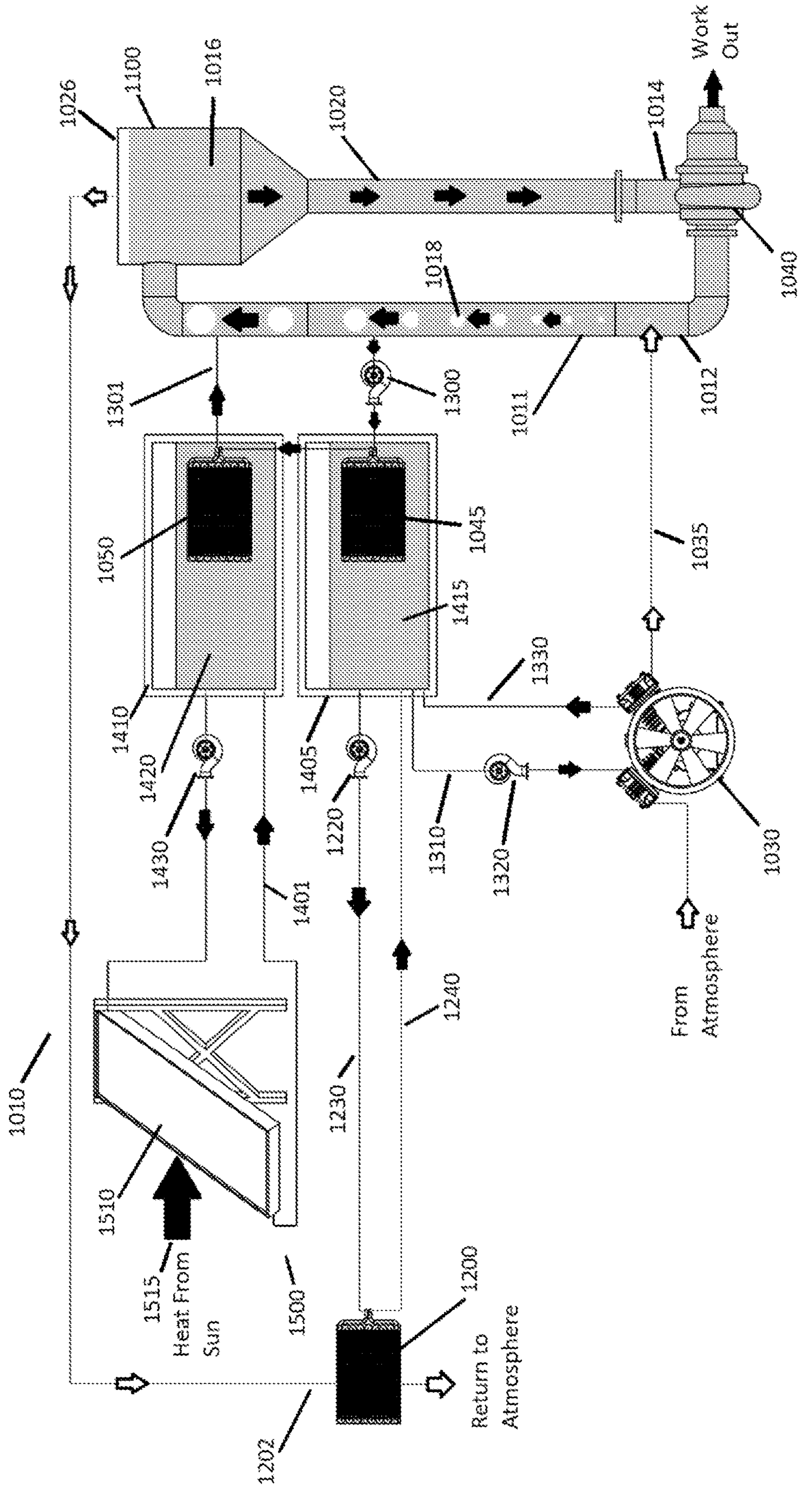
FIG. 1 schematically shows an embodiment of an air-driven generator system in accordance with illustrative embodiments.

At a basic level, the air-driven generator described in U.S. application Ser. No. 16/115,531 has two types of liquid columns connected by a turbine. There is a heavy working liquid in these columns (e.g., 2.6 times heavier than water). The columns of liquid are in conduits. This working liquid can also have non-Newtonian properties. In one column, the buoyancy conduit, pressurized air is introduced into the bottom of the column by, for example, an air compression system such as described in U.S. application Ser. No. 16/250,736. In operation, the pressurized air displaces some of the working liquid in this buoyancy column and the displaced fluid lowers the weight of the buoyancy column relative to the full gravitational column thereby create a force between the two columns that is equal to the weight of the displaced fluid. Because the two columns are connected through a turbine, the fluid flows from the heavy column to the light column as motive flow. The displacement of the working liquid in the buoyancy column is the effective head pressure of the fluid—that is, the level difference between the two columns, which induces movement from the gravitation column into the buoyancy column via the turbine. Electricity is generated as the working liquid moves through the turbine. The design of the tower is such that the displaced fluid from the top of the buoyancy column flows into the top of the gravitational column, thereby maintaining a near constant level in the gravitation column. The steady introduction of air creates a steady-state displacement of fluid and a steady state motive flow.

The inputs to this system are the compressed air and heat captured from the compression system and moved into the working liquid via heat exchangers. The air, as it expands in the working liquid, absorbs heat from the working liquid. Compressed air and heat are constantly added to the working liquid, and the added heat can maintain the working liquid in thermal equilibrium because, in a steady-state operation, the amount of heat absorbed by the air can be equal to the heat added to the working liquid, at a steady state temperature.

The expansion of the air in the working liquid does work on the working liquid that, in total, sustains a volumetric displacement of the working liquid in the buoyancy column. This displacement lowers the overall density of the buoyancy column relative to the gravitation column, resulting in an induced flow of working liquid from the gravitational column into the buoyancy column. This movement is sustained by the working liquid being returned to the gravitation column in the upper chamber. The work done by the air expanding in the buoyancy column is equal to the work necessary to cause the effective displacement of the working liquid between the two columns. This work corresponds to the maximum work able to be extracted by a turbine between the columns. The percentage displacement of the working liquid by the air in the buoyancy column is the effective head pressure of the fluid. Because the two columns are connected through a turbine the fluid flows from the heavy column to the light column as motive flow. As this motive flow passes through the turbine electricity is generated. The steady introduction of air creates a steady-state displacement of fluid and a steady state motive flow.

The air-driven generators described in U.S. application Ser. No. 16/115,531 are thereby able to efficiently utilize the low-grade heat added via the heat exchanger to drive the expansion work of the air and convert this work into electrical power via the turbine. When used with highly efficient air compression systems that also capture the adiabatic heat of compression (as well heat from the condensation of water in the air), such as those described in U.S. application Ser. No. 16/250,736, the captured heat can be transferred to the working liquid coincident with the injection of the pressurized air, thereby allowing the added heat to maintain a thermal equilibrium in the working liquid while the expansion of the air absorbs heat from the working liquid. This operation allows addition of the low-grade heat to support the expansion of the air and thereby sustain the weight difference between the two columns, which, in turn, sustains the power output of the turbine.

Improving Air-Driven Generator Performance

As discussed herein, additional low grade heat added to the working liquid can provide for additional expansion of the air and increase the output from the turbine as the weight difference between the two columns increases with additional expansion of the air in the buoyancy column. One such source of this low-grade heat is from solar thermal energy, which has, in more traditional power systems, needed to be collected and concentrated in order to produce high grade heat. Illustrative embodiments of the present disclosure capture low grade thermal solar energy and transfer this heat to the working liquid of an air-driven generator in order to increase the power output of the turbine or reduce the mass flow of air necessary to produce a given power output target.

Examples of the present disclosure include systems and methods for taking advantage of how the addition of low-grade heat can increase the power output of air-driven generator systems, such as those described in U.S. application Ser. No. 16/115,531, or maintain a power output and significantly lower the amount of air needed to drive the tower and, accordingly, lower the power needed to compress the air.

Examples of the present disclosure include systems and methods for capturing and adding additional heat into the working liquid (e.g., via the heat exchangers). By adding additional heat to working liquid, the working liquid can be heated to higher temperatures and enable more expansion of the air in the working liquid to greater than an ambient volume of the air by heating the air above the ambient temperature from which it was captured.

One source of low-grade heat occurs during the compression cycle of an air compressor feeding the air-driven generator by forcing the water in the air (i.e., humidity) to condense and release the latent heat of condensation. This additional heat, when collected and added to the working liquid of an air-driven generator alongside the compressed air and the captured adiabatic heat of compression, can act on the air to expand the air more by raising the temperature of the expanded air above the ambient temperature at which it was captured. However, the additional expansion of the volume of the air comes at the cost of additional energy used in the compression cycle.

Alternately, examples of the present disclosure enable the use of thermal solar panels that collect heat at very little energy cost and use the captured thermal energy to elevate the fluid temperature higher in the tower. This can be done, for example, by adding the heat to the working liquid via a heat exchanger by running a fluid loop between the heat exchanger and a solar thermal system and/or a thermal storage system heated by a solar thermal system. The resultant higher working liquid temperature, which leads to more expansion of the air expanding in the buoyancy conduit, increases the weight difference across the turbine, which, in turn, increases the net power output and/or lowers the amount of air needed to be compressed by the compression system and injected into the buoyancy conduit. This will increase the ratio of output power compared to input power.

Generally, various embodiments of the present disclosure enable the conversion of low-grade heat into electrical power by adding the low-grade heat to the working liquid of an air-driven generator via the heat exchanger, as discussed above. As discussed herein, solar thermal panels are one source of low-grade heat, but one skilled in the art will appreciate that a multitude of other sources are possible, including as waste heat from several common industrial processes (e.g., condenser heat from HVAC units).

As an example, on average a solar thermal panel will collect 442 BTUs per $ft^2$ per hr. Using a panel of 40 $ft^2$, this equals 17,600 BTUs per panel per hour or 294 BTUs per min per panel. Approximately 1000 panels would fit on one acer of land which means 294,666 BTUs per minute can be put into the system. If a little more than half of the energy was put into low grade storage (approximately 190° F.) for nighttime and cloudy day operation, then 118,000 BTUs per min available for assisting the expansion of the air to increase the power output of the plant.

Because the temperature of the air in the air-driven generator, when adding this solar thermal heat, is exiting at a significantly higher-than-ambient temperature, examples of the present disclosure include the use of a regenerative heat exchanger at the upper chamber of the air-driven generator in order to recapture a large amount of the heat that would otherwise be lost to the environment when the expanded air is exhausted after escaping from the working liquid in the upper chamber. This regenerative heat recapture system may include the use of a heat pump system. This heat is captured at a much lower energy cost than the heat captured in the compression system, though still at a higher cost than heat captured by the solar panels, this added regenerative heat exchanger can extend the period of time the heat from the solar panels can increase power by decreasing the rate at which the thermal energy captured by the solar thermal system is returned to the environment by the escaping air.

FIG. 1 schematically illustrates various embodiments of the present disclosure as an air-driven generator system 1010 in accordance with illustrative embodiments. The air-driven generator system 1010 of FIG. 1 includes an air-driven generator 1100 that includes a buoyancy conduit 1011, a gravitational distribution conduit 1020, an air compression system 1030, a turbine 1040 positioned between and fluidly coupling a lower end of the gravitational distribution conduit 1014 with a lower end of the buoyancy conduit 1012. A heavy working liquid 1016 is circulated through the air-driven generator system 1010 of FIG. 1. The air compression system 1030 injects compressed air 1018 through first gas line 1035 into the lower end of the buoyancy conduit 1012. The pressurized air 1018 displaces some of the working liquid 1016 in the buoyancy conduit 1012, and the displaced working liquid lowers the weight of the buoyancy column relative to the full gravitational column. The weight difference between the two columns creates a force between the two columns that is equal to the weight of the displaced fluid.

The air-driven generator system 1010 also has a first heat exchanger 1405 that is fluidically connected to the buoyancy conduit 1011 for receiving working liquid 1016 from the buoyancy conduit 1011. The first heat exchanger 1405 is configured to add thermal heat to the working liquid 1016 passing from the liquid turbine 1040 into the buoyancy conduit 1011. The working liquid 1016 is impelled into a first radiator 1045 by a first pump 1300 that is in fluidic communication with buoyancy conduit 1011. As the working liquid 1016 flows through radiator 1045 it is heated by thermal exchange with first heat exchange fluid 1415.

First heat exchange fluid 1415 is itself heated by being circulated through a second radiator 1200 (e.g., third heat exchanger), and by being circulated through a radiator in fluidic communication with hot, compressed air from compression system 1030. First heat exchange fluid 1415 is impelled into a second radiator 1200 by a second pump 1220 through liquid conduit 1230 that is in fluidic communication with the first heat exchange fluid 1415 in first heat exchanger 1405. As the working liquid 1016 flows through radiator 1045 it is heated by thermal exchange with compressed air 1018 that is expelled from an upper chamber 1026 of the air-driven generator into second air line 1202. The compressed air 1018 that is expelled from the air-driven generator 1100 into second air line 1202 is at a higher temperature than when it was injected into the lower end of the buoyancy conduit 1012 and at a higher temperature than working liquid 1016. After exchanging thermal energy with the compressed air 1018 in second radiator 1200, the working liquid 1016 is returned to buoyancy conduit 1011 and the compressed air 1018 is expelled to the surrounding atmosphere.

First heat exchange fluid 1415 is also heated by thermal exchange with the air compressed 1018 by compression system 1030. First heat exchange fluid 1415 is impelled into the compressor system (e.g., air injection system) 1030 by a third pump 1320 that is in fluidic communication along fluid conduit 1310 with the first heat exchange fluid 1415 in first heat exchanger 1405. In some embodiments, the compressor system 1030 may employ the use of a cascading series of heat pump intercoolers as described in U.S. Pat. No. 10,989,110. The compressor system 1030 takes in air from the surrounding atmosphere and compresses the air to be injected as compressed air 1018 into the lower end of the buoyancy conduit 1012.

The air-driven generator system 1010 further includes a solar thermal heating system 1500 fluidically coupled to a second heat exchanger 1410. The solar thermal heating system 1500 provides additional thermal energy to the air-driven generator 1100 through an effective heat transfer of the solar thermal energy by a second heat transfer fluid 1420 to the working liquid 1016 circulating through radiator 1050. The transfer of heat from the solar thermal heating system 1500 to the working liquid 1016 increases the temperature of the working liquid 1016, thereby increasing the temperature of the expanding compressed air 1018 and, therefore, increasing the energy output of the air-driven generator 1100.

The solar thermal heating system 1500 includes a plurality of solar thermal panels 1510 configured to absorb solar radiation 1515, and a fluid loop 1401 that conveys the thermal energy (heat) to the second heat exchanger 1410. The second heat exchanger 1410 includes a second heat transfer fluid 1420 configured to absorb heat generated in the solar thermal panels 1510 as the second heat transfer fluid 1420 circulates through the fluid loop 1401.

The fluid loop 1401 is fed by the second heat transfer fluid 1420 as it is pumped by pump 1430 through fluid loop 1401 into the solar thermal heating system 1500. As the second heat transfer fluid 1420 circulates through the solar thermal heating system 1500 it is heated by absorbing solar radiation 1515. The second heat transfer fluid 1420 is then pumped to the second heat exchanger 1410.

The working liquid 1016 that circulates through radiator 1045 is conveyed to radiator 1050 where the working fluid 1016 absorbs heat from the second heat transfer fluid 1420. The heated working liquid 1016 is conveyed from the second radiator 1050 back to the buoyancy conduit 1011.

Figure 2:
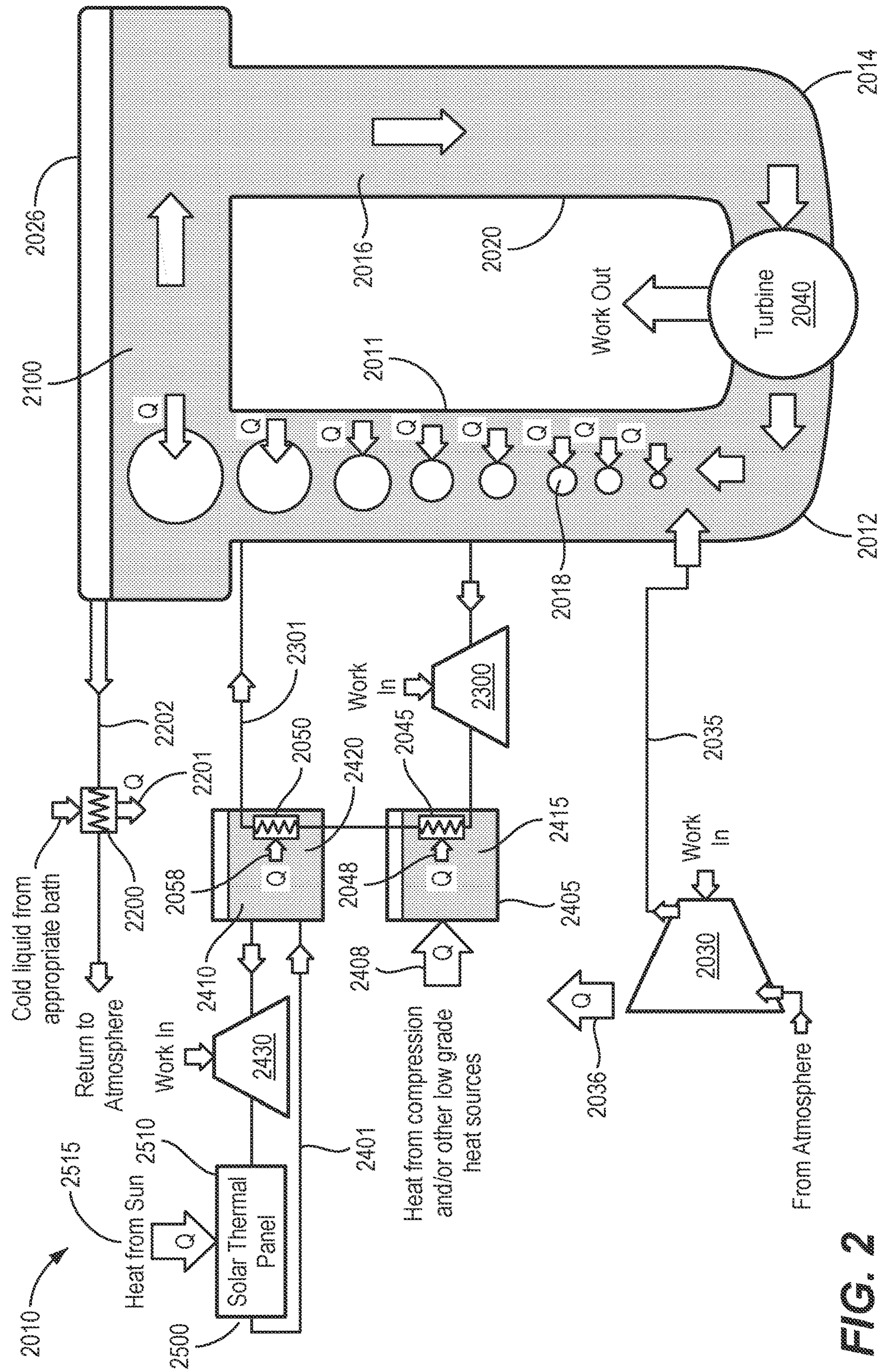
FIG. 2 schematically shows an embodiment of an air-driven generator system in accordance with illustrative embodiments.

FIG. 2 schematically illustrates various embodiments of the present disclosure as an air-driven generator system 2010 in accordance with illustrative embodiments. In FIG. 2, many of the components of the air-driven generator system 1010 are presented as thermodynamic components to describe energy flows through the system. Therefore, some physical components such as fluid lines or air lines are omitted from the FIG. 2 schematic to simplify the discussion of energy flows.

The air-driven generator system 2010 of FIG. 2 includes an air-driven generator 2100 that includes a buoyancy conduit 2011, a gravitational distribution conduit 2020, an air compression system 2030, and a turbine positioned between and fluidly coupling a lower end 2014 of the gravitational distribution conduit 2011 with a lower end of the buoyancy conduit 2012. A heavy working liquid 2016 is circulated through the air-driven generator system 2010 of FIG. 2 in the direction indicated by the arrows.

The circulating working fluid 2016 turns the turbine 2040 and performs work that produces electrical energy, as represented by the large arrow coming out of the turbine with the words "Work Out." The amount of energy (e.g., electrical power) produced by the turbine is proportional to the head difference of the gravitational conduit 2020 and the buoyancy conduit 2011, the weight (e.g., density) of the working fluid 2016, and the downward velocity of the working fluid 2016.

While the actual density of the working liquid is determined by its composition, the "effective" density of the working liquid 2016 in the buoyancy conduit 2011 is determined by taking a weighted average of the densities of working liquid 2016 and the expanding compressed air 2018, where the weighting fractions are the fraction of volume each substance takes inside the buoyancy conduit 2011. The presence of the compressed gas 2018 in the buoyancy conduit 2011 displaces an equivalent volume of the heavy working fluid 2016. That is, the weight difference between the two columns caused by the presence of the expanding compressed air 2018 in the buoyancy conduit 2011. This creates a force between the two columns that is equal to the weight of the displaced working fluid 2016. Therefore, the power produced by the air-driven generator is increased by increasing the volume flow rate of the compressed air 2018, and/or increasing the specific volume of the compressed air 2018 during expansion in the buoyancy column 2011 by adding heat to the system.

Energy in the form of electrical power and low grade thermal heat is transferred to the air-driven generator system. Electrical power is provided to pumps and compressors to compress air and to circulate air and fluids. Low grade thermal power is captured from adiabatic compression, hot gas that is exhausted from the system and from solar thermal panels. The thermal power is transferred to the system via thermal exchange in heat exchangers, where the working fluid is circulated through radiators that are in a thermal transfer fluid (e.g., one or more thermal baths). Finally, the low grade thermal power stored in the thermal baths is transferred to the working fluid in the buoyancy conduits by circulating the working fluid through the radiators in the thermal baths.

Referring to both FIG. 1 and FIG. 2, the air compression system 2030 injects compressed air 2018 (e.g., through the first air line 2035) into the lower end of the buoyancy conduit 2012. The pressurized air 2018 displaces some of the working liquid 2016 in the buoyancy conduit 2012, and the displaced working liquid 2016 lowers the weight of the working fluid 2016 in the buoyancy column 2011 relative to the full weight of the working fluid 2016 in the gravitational column 2020. The compressed air 2018 bubbles are shown as growing as they rise in the buoyancy conduit 2012. The growing bubbles of compressed air 2018 illustrate that the air is undergoing a polytropic expansion, meaning that heat addition is simultaneous with expansion. That is, the compressed 2018 air is receiving heat from the working fluid 2016 as it expands and moves towards the top of buoyancy conduit 2011. This is illustrated by the arrows with a "Q" pointing at the air bubbles, indicating that heat (e.g., energy) is being transferred from the working fluid 2016 to the expanding compressed air 2018.

The compressed air 2018 is initially conveyed (e.g., through first gas line 2035) and injected into the air-driven generator 2100 by compression system 2030. The compression system is shown as receiving "Work In", meaning energy is being put "into" the compressor in the form of electrical power. The compressor system 2030 adds energy to the gas as it compresses it, causing the temperature of the air to rise, hence the arrow with a "Q" 2036 leaving the compressor indicating heat captured from compression is transferring to the air-driven generator 2100. In some embodiments, the compressor system 2030 may be a cascading compression system used in conjunction with a cascading heat pump system (as disclosed in U.S. patent application Ser. No. 17/229,477).

Additional thermal energy from the hot compressed air may be stored in a first heat exchanger for thermal transfer to the working fluid. The hot, air 2018 that collects at the upper chamber 2026 of the air-driven generator is removed from the upper chamber 2026 of the air-driven generator 2100 and conveyed (e.g., through gas line 2202) to third heat exchanger 2200 (e.g., second radiator 2200) where the heat in the hot, air is transferred, as indicated by the arrow with a "Q" 2201, to first heat transfer fluid 2415, and the heat in the first heat transfer fluid 2415 is circulated back to first heat exchanger 2405. In this way, heat is transferred from the exiting air 2202 (the arrow with a "Q" 2201) to the first heat transfer fluid 2415, which raises the temperature of the first heat transfer fluid 2415 (e.g., first thermal bath) in first heat exchanger 2405, as indicated by the arrow with a "Q" 2408.

Furthermore, additional thermal energy from the solar thermal heating system 2500 may be stored in a second heat exchanger for thermal transfer to the working fluid. The solar thermal panels 2510 collect heat from the sun, as indicated by indicated by the arrow with a "Q" 2515. The second heat transfer fluid 2420 is circulated (e.g., along liquid conduit 2401) from second heat exchanger 2410 to the solar thermal panels 2510 where the heat from sun 2515 is transferred to the second heat transfer fluid 2420 before it is circulated back to the second heat exchanger 2410. The heat transfer from the sun to the second heat transfer fluid is indicated by the arrow with a "Q" 2515.

The additional thermal energy that is stored in the first heat exchanger and the second heat exchanger may be transferred into the heavy working fluid 2016 in the buoyancy conduit 2012 by circulating the heavy working fluid through fluid circuit 2301. In fluid circuit 2301, the heavy working fluid 2016 is pumped by pump 2300 from the buoyancy conduit 2011 to the first heat exchanger 2405 where the working fluid 2016 passes through first radiator 2045. As the working fluid 2016 passes through the first radiator 2045, thermal heat is transferred from the first heat exchanger (e.g., first heat exchange fluid 2415) to the working fluid 2016, as indicated by the arrow with a "Q" 2048, and the working fluid 2016 is conveyed to the second heat exchanger 2410.

Once in the second heat exchanger 2410, the working fluid 2016 passes through the second radiator 2050. As the working liquid 2016 passes through the second radiator 2050, thermal heat is transferred from the second bath (e.g., second heat exchange fluid 2420) to the working liquid 2016, as indicated by the arrow with a "Q" 2058.

The first heat exchanger fluid 2415 temperature is greater than the temperature of the working liquid 2016 in the buoyancy conduit 2011, and the second heat exchanger fluid 2420 temperature is greater than the first bath temperature. After leaving the second heat exchanger 2410, the working liquid 2016 is returned to the buoyancy conduit 2011 at a higher temperature than it was when it was removed from the buoyancy conduit 2011. That is, as the working liquid 2016 circulates through fluid circuit 2301, the temperature of the working liquid 2016 is raised.

In some embodiments, the first heat exchange fluid 2415, 1415 (e.g., first bath) and the second heat exchange fluid 2420, 1420 (e.g., second bath) are the same fluids. In some embodiments, the first heat exchange fluid 2415, 1415 (e.g., first bath) and the second heat exchange fluid 2420, 1420 (e.g., second bath) are the different fluids. The selection of the heat exchange fluid for a given bath in a heat exchanger depends on the expected operating temperatures of the baths.

The embodiments of the invention described above are intended to be merely exemplary; numerous variations and modifications will be apparent to those skilled in the art. Such variations and modifications are intended to be within the scope of the present invention as defined by any of the appended claims.

The invention claimed is:

1. An air-driven generator system for generating electric power from movement of a working liquid, the air-driven generator system comprising: an elongate gravitational distribution conduit with an upper end and a lower end; plural elongate buoyancy conduits, each elongate buoyancy conduit with an upper end and a lower end; wherein: the upper ends of the plural elongate buoyancy conduits are in fluidic communication with the upper end of the elongate gravitational distribution conduit and an upper chamber; and the lower end of the elongate gravitational distribution conduit is in fluidic communication with the lower ends of the plural elongate buoyancy conduits such that a closed fluid loop is formed between the plural elongate buoyancy conduits, the elongate gravitational distribution conduit, and the upper chamber, with working liquid flowing from the upper ends of the plural elongate buoyancy conduits fed into the upper end of the elongate gravitational distribution conduit and working liquid flowing downwardly through the elongate gravitational distribution conduit being fed from the lower end of the elongate gravitational distribution conduit into the lower ends of the plural elongate buoyancy conduits; a liquid turbine system fluidically interposed between the lower end of the elongate gravitational distribution conduit and the lower ends of the plural elongate buoyancy conduits; an air injection system operative to inject air into the lower ends each of the plural elongate buoyancy conduits; a first heat exchanger in fluidic communication with the lower end of each of the plural elongate buoyancy conduits, the first heat exchanger comprises a first heat exchange fluid; a second heat exchanger in fluidic communication with the first heat exchanger and in fluidic communication with each of the plural elongate buoyancy conduits, the second heat exchanger comprises a second heat exchange fluid; and a thermal heating system configured to capture thermal energy from an external source, the thermal heating system being thermally coupled with the second heat exchanger to move the captured thermal energy into the working liquid; wherein the injection of air into the working liquid disposed in the plural elongate buoyancy conduits will tend to induce upward flow of the working liquid in the plural elongate buoyancy conduits such that working liquid fed to the upper end of the elongate gravitational distribution conduit will have a downward flow within the elongate gravitational distribution conduit to actuate the liquid turbine system, and further comprising a third heat exchanger configured to move heat from air exiting the upper chamber to the first heat exchanger.

2. The system of claim 1,
wherein the thermal heating system comprises solar thermal panels configured to capture thermal energy from solar radiation.

3. The system of claim 2,
wherein the thermal heating system comprises a fluid loop containing a fluid for moving thermal energy from the solar thermal panels to the second heat exchanger.

4. The system of claim 1,
wherein the air injection system comprises a cascading series of heat pump intercoolers.

5. The system of claim 1, wherein the first heat exchange fluid and the second heat exchange fluid comprise the same material.

6. The system of claim 1, wherein the first heat exchange fluid and the second heat exchange fluid comprise different materials.

7. The system of claim 1, wherein one or more of the first heat exchange fluid or the second heat exchange fluid are in thermal communication with a phase change material for the purpose of heat storage.

8. An air-driven generator system for generating electric power from movement of a working fluid, the air-driven generator system comprising: an air-driven generator, comprising: an elongate gravitational distribution conduit with an upper end and a lower end; plural elongate buoyancy conduits, each elongate buoyancy conduit with an upper end and a lower end; wherein the upper ends of the plural elongate buoyancy conduits are in fluidic communication with the upper end of the elongate gravitational distribution conduit and an upper chamber; and the lower end of the elongate gravitational distribution conduit is in fluidic communication with the lower ends of the plural elongate buoyancy conduits such that a closed fluid loop is formed between the plural elongate buoyancy conduits, the elongate gravitational distribution conduit, and the upper chamber, with working fluid flowing from the upper ends of the plural elongate buoyancy conduits fed into the upper end of the elongate gravitational distribution conduit and working fluid flowing downwardly through the elongate gravitational distribution conduit being fed from the lower end of the elongate gravitational distribution conduit into the lower ends of the plural elongate buoyancy conduits; a fluid turbine system fluidically interposed between the lower end of the elongate gravitational distribution conduit and the lower ends of the plural elongate buoyancy conduits; a thermal transfer fluid circuit comprising: a first heat exchanger in fluidic communication with each of the plural elongate buoyancy conduits, the first heat exchanger comprises a first heat exchange fluid; a second heat exchanger in fluidic communication with the first heat exchanger and in fluidic communication with each of the plural elongate buoyancy conduits, the second heat exchanger comprises a second heat exchange fluid; wherein: a portion of working fluid in the plural elongate buoyancy conduits is removed from the lower end of each of the plural elongate buoyancy conduits; the portion of working fluid circulates through the thermal transfer fluid circuit; and the portion of working fluid is returned to the plural elongate buoyancy conduits; a compressor system in fluidic communication with each of the plural elongate buoyancy conduits and in fluidic communication with the first heat exchanger; wherein; the compressor system is operative to inject air into each of the plural elongate buoyancy conduits; and the compressor system is configured to: receive a portion of the first heat exchange fluid from the first heat exchanger; transfer heat to the portion of the first heat exchange fluid; and return the heated portion of the first heat exchange fluid to the first heat exchanger; a solar thermal heating system fluidically coupled to the second heat exchanger configured to transfer heat collected by the solar thermal heating system to the second heat exchanger; wherein: the injection of air into the working fluid disposed in the plural elongate buoyancy conduits will tend to induce upward flow of the working fluid in the plural elongate buoyancy conduits such that working fluid fed to the upper end of the elongate gravitational distribution conduit will have a downward flow within the elongate gravitational distribution conduit to actuate the fluid turbine system; and the circulation of the portion of working fluid through the thermal transfer circuit will tend to increase the temperature of the working fluid in the plural elongate buoyancy conduits.

9. The system of claim 8, further comprising:
a third heat exchanger in fluidic communication with the upper chamber and in fluidic communication with the first heat exchanger, the third heat exchanger configured to:
receive air from the upper chamber;
transfer heat present in the air to the first heat exchange fluid; and
transfer the heat present in the first heat exchange fluid to the first heat exchanger.

10. The system of claim 8, wherein:
the first heat exchanger comprises a first radiator; and
the second heat exchanger comprises a second radiator.

11. The system of claim 8, wherein:
the first heat exchange fluid comprises a first refrigerant; and
the second heat exchange fluid comprises a second refrigerant.

12. The system of claim 11, wherein the first refrigerant and the second refrigerants are the same material.

13. The system of claim 11, wherein the first refrigerant and the second refrigerants are different materials.

* * * * *